C. J. GADD, DEC'D.
A. E. GADD, EXECUTRIX.
TELLTALE MEANS FOR CONTROLLING THE FEED OF MATERIAL TO HOPPERS OR BINS.
APPLICATION FILED OCT. 19, 1915.
1,304,553.
Patented May 27, 1919.
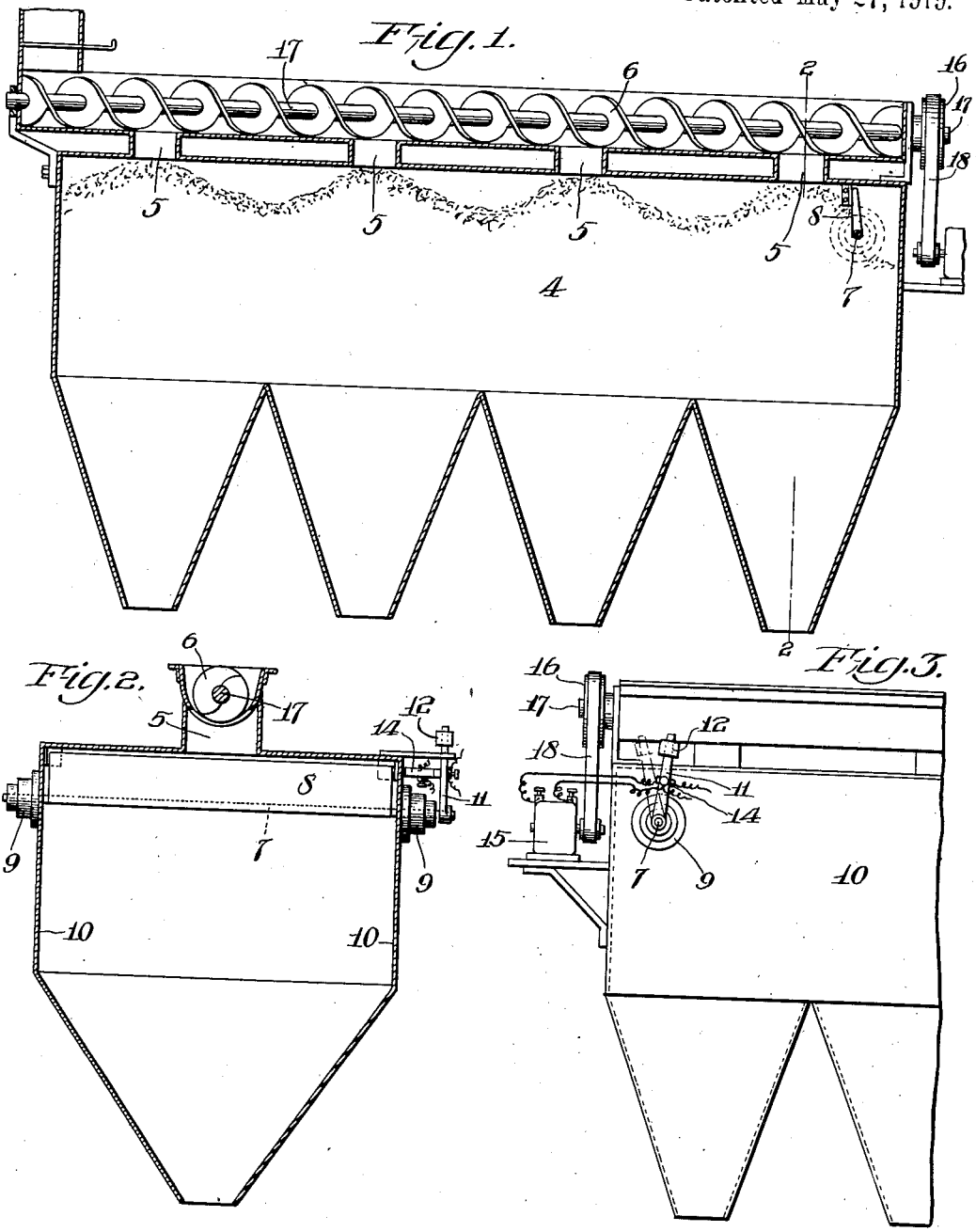

UNITED STATES PATENT OFFICE.

CHARLES J. GADD, OF LEBANON, PENNSYLVANIA; ANNA EYRE GADD EXECUTRIX OF SAID CHARLES J. GADD, DECEASED.

TELLTALE AND MEANS FOR CONTROLLING THE FEED OF MATERIAL TO HOPPERS OR BINS.

1,304,553.

Specification of Letters Patent. Patented May 27, 1919.

Application filed October 19, 1915. Serial No. 56,741.

*To all whom it may concern:*

Be it known that I, CHARLES J. GADD, a citizen of the United States, and a resident of the city and county of Lebanon, in the State of Pennsylvania, have invented certain new and useful Improvements in Telltales and Means for Controlling the Feed of Material to Hoppers or Bins, of which the following is a specification.

My invention relates to an improved means for controlling the feed of a solid material to a bin or hopper and the object of my invention is to furnish a telltale and means, operative through the material fed to the bin or hopper, which will notify the operator that the bin is full and which will automatically stop the feeding mechanism when the material in the bin reaches a predetermined height.

I have illustrated my invention in connection with an electrically driven screw conveyer of well-known type; it will be understood, however, that I do not desire to confine myself to any particular form of conveyer or any particular mechanism for operating the same, for any of the well-known mechanisms may be used for these purposes.

In the accompanying drawings forming part of this specification and in which similar letters of reference indicate similar parts throughout the several views:—

Figure 1, is a longitudinal central sectional elevation through a closed hopper furnished with an electrically driven screw conveyer for feeding material and with my means for stopping the driving of the conveyer when the material reaches a certain height in the hopper:

Fig. 2, a section of Fig. 1 on line 2—2:

Fig. 3, an end view of part of the hopper showing my conveyer driving mechanism.

My invention relates to the feeding of solid material in finely divided form, particularly pulverized material and provides a simple and effective means for utilizing the weight of the banked material to operate a switch-throwing vane to stop the conveyer. The nature of my invention permits the vane to be so set as to have a quick throw when tripped.

The bin or hopper 4 is closed at its sides, ends and top save for the openings 5 in the top through which the material carried to them by the conveyer drops. In Fig. 1 four openings 5 are shown but, of course, the number of these openings may be increased or diminished without in any way affecting my invention. The conveyer feeds the material from left to right and the hopper fills first at the left then successively through the holes 5 until the filling is completed through the hole 5 at the extreme right end. As the hopper is closed it is almost impossible for the attendant to assure himself that its filling has been completed hence I have devised an apparatus as follows for stopping the mechanism which feeds the material to the bin, when the filling is completed.

7 is a shaft at the far, or right hand, end of the hopper which carries within the hopper a blade 8, which is carried in bearings 9 on the sides 10 and which is furnished at one or both ends with an arm 11 which carries a counterweight 12.

Both the blade 8 and arm 11 project upward from shaft 7 and when in their normal, or set, position are slightly off center or perpendicular. A suitable stop 13, Figs. 1 and 2, forms a support against which the top of blade 8 may rest when "set."

The blade being set as shown and the material being fed into the hopper through the opening 5 contiguous to the blade presently piles up and bears against, in the present instance, the left hand side of the blade and as the pile increases it bears harder and harder against this left hand side of the blade until presently this latter is moved to the right until it passes the perpendicular when it suddenly falls to the right, being assisted in this by the counterweighted arm 11.

Upon the arm 11 is an electric contact 14 which when the arm falls breaks the connection to the motor 15 which then stops and feed of material to the hopper ceases until the operator again makes the connection by returning the arm 11 and the blade 8 to their elevated or original positions.

In the drawings the motor 15 is connected with a driving pulley 16 on the shaft of the worm 6 by a belt 18.

While I have indicated in the drawings an electrical means for driving the conveyer which carries the material to the bin, it will be understood that I do not desire to confine myself to any particular means for this purpose for it will be obvious that it would be a simple matter for anyone with mechanical skill to make a proper connection between the tilting blade 8 and any form of conveyer driving or material flow controlling means.

Having thus described my invention I claim as new and desire to secure by Letters Patent:

1. The combination with a hopper, a conveyer on top of said hopper for feeding a finely divided solid material thereto, and an electrical means for driving said conveyer, of a shaft passing through said hopper, a blade carried by said shaft within said hopper, a counterweighted arm carried by said shaft without said hopper, and an electrical contact carried by said arm closing the circuit that operates the electrical driving means of said conveyer, said blade and counterweighted arm being normally held slightly off the perpendicular and being adapted when tripped over the perpendicular by an accumulation of material in said hopper to break the electrical connection to said conveyer driving means.

2. In a conveyer system for filling bins, a bin adapted to receive pulverized material, a conveyer feeding the material to the bin from above, driving means for the conveyer, a blade pivoted in the bin in nearly vertical position and against which the material is adapted to impinge from the side to swing the blade beyond the vertical position on the other side and connections between the blade and driving means to shut off the latter when the blade is swung.

3. In a conveyer system, for filling bins, a bin adapted to receive pulverized material, a conveyer feeding the material to the bin from above, driving means for the conveyer, a blade within the bin adapted to swing about an axis below the body of the blade and nearly in perpendicular position, leaning therefrom toward the material to be piled, connections between the blade and driving means to shut off the latter when the blade is moved and a counterweight for the blade to give it a quick throw.

4. In a conveyer system for filling bins, a bin adapted to receive pulverized material, a conveyer feeding the material into the bin from above, driving means for the conveyer and a blade adapted to lie in the bin, to be moved by the material as it is piled within the bin, and to remain in moved position until reset, in combination with connections between the blade and the driving means to shut off the latter when the blade is moved.

CHARLES J. GADD.

Witnesses:
J. W. MASON,
J. W. EDMONDS.